3,068,640
FAST BURNING FUELS

Cleveland R. Scott and Evan L. Allred, Bartlesville, Okla., assignors to Phillips Petroleum Company, a corporation of Delaware
No Drawing. Filed Aug. 18, 1952, Ser. No. 305,064
34 Claims. (Cl. 60—35.4)

This invention relates to rocket fuels. In one of its more specific aspects, this invention relates to hypergolic fuels. In another of its more specific aspects, this invention relates to a method for propelling rockets.

My invention is concerned with new and novel rocket propellants and their utilization. A rocket or jet propulsion device, such as is discussed herein is defined as a rigid container for matter and energy, so arranged that a portion of the matter can absorb the energy in kinetic form and subsequently eject it in a specified direction. The type rocket to which my invention is particularly applied is that type of rocket propulsion device designated as a "pure" rocket, i.e., a thrust producer which does not make use of the surrounding atmosphere. A rocket of the type with which my invention is concerned is propelled in response to the steps of introducing a propellant material into a combustion chamber therein, and burning it under conditions that will cause it to release energy at a high but controllable rate immediately after its entry into the combustion chamber. Rocket propellants in liquid form are advantageously utilized inasmuch as the liquid propellant material can be carried in a light weight, low pressure vessel and thereafter pumped into the combustion chamber. It is thus necessary, that the combustion chamber, although being strong enough to withstand high pressure and temperature, need be only large enough to insure combustion. The flow of liquid propellant into the combustion chamber can be regulated at will so that the thrust resulting from continuous or intermittent bursts of power can be sustained. Intermittent burning of the fuel contributes to a longer life of the combustion chamber and of the thrust nozzle. Various methods and liquid combinations have been found useful as rocket propellants. Some propellants consist of a single material, and are termed "monopropellants." Those propellants involving two materials are termed "bipropellants" and normally consist of an oxidizer and a fuel. Hydrogen peroxide and nitromethane are each well known monopropellants. Well known bipropellants include hydrogen peroxide or liquid oxygen as the oxidant with a fuel component such as ethyl alcohol-water, ammonia, hydrazine, or hydrogen. Additional known bipropellants include nitric acid as the oxidizer with aniline or furfuryl alcohol as the hypergolic fuel component.

When employing 90–100 percent nitric acid, i.e., "white fuming nitric acid" as the oxidizer in a rocket bipropellant, it is often necessary, dependent upon the specific fuel component, to obtain more effective ignition than would normally be obtained, by dissolving from 6 to 14 percent by weight of nitrogen dioxide in the white fuming acid, thereby forming "red fuming" nitric acid. A fuel component of the bipropellant-material of the type described herein, is spontaneously ignited upon contacting the oxidizer. For this reason such a bipropellant-material is referred to herein as being "hypergolic." A ratio of oxidizer to hypergolic fuel, based upon stoichiometric amounts, can be utilized within the limits of 0.5:1 to 1.5:1 if desired. The efficiency of combustion is less at a ratio below 1:1 and the use of the oxidizer is less economical at ratios above 1:1. However, practical consideration may necessitate the use of higher ranges, even as high as 6:1.

At least one of the following objects of the invention will be attained by at least one of the aspects of this invention.

An object of this invention is to provide new rocket propellants. Another object of the invention is to provide novel hypergolic fuels. Another object of the invention is to provide a method for producing immediate thrust to a rocket-type device. Another object is to provide improved fast burning fuels. Other and further objects will be apparent to those skilled in the art upon study of the accompanying disclosure.

In accordance with the broad aspect of this invention, we have found that mixtures of sulfenamides and selected mercaptans, both more fully set forth hereinbelow, either in the presence or absence of a hydrocarbon fuel, form a fuel component which is highly "hypergolic," suitable for use in the propulsion of rockets, guided missiles and the like in conjunction with an oxidizer. The fuel mixtures of the present invention are composed of at least one sulfenamide and at least one selected mercaptan, either component being suitable for use in a major or minor amount. Preferably mixtures containing at least 10 mol percent of a sulfenamide and not more than 90 percent of the sulfenamide will be employed. Under the broad term "sulfenamide" we also include the thiosulfenamides. In general, the sulfenamide constituent of this invention is characterized by the following structural formulas:

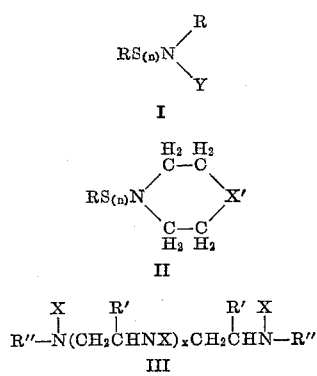

Wherein X is selected from the group consisting of hydrogen and an $S_{(n)}R$ group, at least one X being an $S_{(n)}R$ group, R is selected from the group consisting of an alkyl group containing from 1 to 12 carbon atoms, an alkenyl group containing from 2 to 12 carbon atoms, a cycloalkyl group containing from 5 to 6 carbon atoms, and an aryl group containing 6 carbon atoms, R' is selected from the group consisting of hydrogen and a methyl radical, R" is selected from the group consisting of hydrogen, an alkyl group containing from 1 to 12 carbon atoms, an alkenyl group containing from 2 to 12 carbon atoms, a cycloalkyl group containing from 5 to 6 carbon atoms and an aryl group containing 6 carbon atoms, X' is selected from the group consisting of a methylene group, =NR, =NH, =NS$_{(n)}$R, sulfur, and oxygen, Y is selected from the group consisting of hydrogen and an S$_{(n)}$R group, n is an integer selected from the group consisting of 1 and 2 and when X' is oxygen, n is 2, x is an integer selected from a group of 0 through 5, inclusive, and the sulfenamide constituent contains not more than 30 carbon atoms.

Illustrative of the sulfenamides used in our invention are the following: N-n-butyl-tert-butylsulfenamide, N-tert-butyl-tert-butylthiosulfenamide, N-tert-octyl-tert-dodecylsulfenamide, N-tert-dodecyl-tert-decylthiosulfenamide, N-cyclohexyl-tert-butylsulfenamide, N-cyclopentyl-tert-octythiosulfenamide, N-tert-butylcyclohexylthiosulfenamide, N-vinyl-tert-butylsulfenamide, N-tert-dodecenyl-tert-octylthiosulfenamide, N,N-di(tert-butylsulfenyl)tert-butylamine, N,N-di(tert-butylsulfenyl)-tert dodecylamine, N,N-di(cyclohexylsulfenyl)tert-butylamine, N-tert-butylsulfenyl piperidine, N-isopropylsulfenyl piperidine, N-tert-butylthiosulfenyl piperidine, N-tert-octylsulfenyl piperidine, N-tert-dodecylthiosulfenyl piperidine, N-cyclohexylsulfenyl piperidine, N-ethylsulfenyl piperidine, N-cyclopentylthiosulfenyl piperidine, N,n-butenylsulfenyl piperidine, N-tert-butylthiosulfenyl morpholine, N-tert-octylthiosulfenyl morpholine, N-tert-dodecylthiosulfenyl morpholine, N-cyclopentylthiosulfenyl morpholine, N-phenylthiosulfenyl morpholine, N-tert-butyl piperazine, N-tert-butylsulfenyl-N'-tert-butylsulfenyl piperazine, N-tert-butylsulfenyl-N'-tert-butyl piperazine, N-cyclohexylthiosulfenyl piperazine, N-cyclopentylsulfenyl-N'-tert-butyl piperazine, N-cyclopentylsulfeny-N'-tert-butylthiosulfenyl piperazine, N-tert-butylsulfenylthiamorpholine, N-tert-octylthiosulfenyl-thiamorpholine, N-cyclohexylsulfenylthiamorpholine, Ethylene di(tert-butylsulfenamide), Propylene di(tert-butylsulfenamide), Triethylene tetra(tert-butylsulfenamide), Tetraethylenepenta(tert-butylsulfenamide).

One suitable method for the preparation of sulfenaides applicable for use in the present invention is set forth by C. M. Himel et al. in U.S. Patent 2,520,400, wherein it is disclosed that sulfenamides are produced by the interaction of sulfenyl halides with amines in the presence of an alkaline material, such as sodium hydroxide or the like. Other sulfenamides can be produced in the manner disclosed by C. M. Himel et al. in U.S. Patent 2,520,401 wherein it is disclosed that the thiosulfenamides are produced by the interaction of thiosulfenyl halides with amines in the presence of an alkaline material, such as sodium hydroxide. The compounds of the structural Formula III are prepared by the interaction of alkylene polyamines and polyalkylene polyamines with alkyl sulfenyl chlorides. Further details regarding the preparation of the compounds characterized by structural Formula III can be found in copending application, Serial Number 67,768, filed December 28, 1948, by C. M. Himel et al., now Patent 2,671,804.

Mercaptans which form a portion of the hypergolic fuel constituent of this invention in admixture with the above described sulfenamides include compounds of the general formula RSH, wherein R is selected from the group consisting of alkyl and alkenyl radicals having not more than 10 carbon atoms. Illustrative of the mercaptans used in this invention are tert-butyl mercaptan, isopropyl mercaptan, allyl mercaptan, n-butyl mercaptan, n-hexyl mercaptan, tert-hexyl mercaptan, tert-octyl mercaptan, tert-decyl mercaptan, isopropenyl mercaptan, $\Delta^1$-butenyl mercaptan, $\Delta^2$-butenyl mercaptan, $\Delta^3$-butenyl mercaptan, and isobutenyl mercaptan.

The fuel constituent of the present invention, i.e., mixtures consisting of a sulfenamide and a mercaptan are hypergolic in an undiluted state and are also hypergolic when admixed with non-hypergolic materials, particularly hydrocarbons, even in a state of dilution as high as from 10 to 70 percent by volume when white fuming nitric acid is used as the oxidant. Suitable non-hypergolic diluents which also form a portion of the fuel composition include paraffin, cycloparaffin, olefin, or aromatic hydrocarbons in the $C_5$ to $C_{35}$ range or mixtures thereof, preferably the normally liquid materials. Examples of such hydrocarbon fuels are n-hexane, n-heptane, benzene, kerosene, isooctane, diisobutylene, cyclohexene, cyclohexane, isodecane, methylcyclohexane, toluene, hexadecane, eicosane, hexacosane, tetratriacontane, picene, cyclononacosane, tetraphenylethylene, and the like. Hydrocarbons in the $C_5$ to $C_{16}$ range are preferred.

Other oxidizers are suitable oxidants for these hypergolic fuels in addition to white or red fuming nitric acid and can be used in the bipropellant fuel compositions of our invention. Suitable oxidants include materials such as hydrogen peroxide, ozone, nitrogen tetroxide, liquid oxygen and mixed acids, especially anhydrous mixtures of nitric and sulfuric acids such as 80–90 percent by volume white or red fuming nitric acids and 10 to 20 percent by volume anhydrous or fuming sulfuric acid. It is within the scope of this invention to employ, preferably dissolved in the oxidizer, ignition catalysts or oxidation catalysts. These oxidation catalysts include certain metal salts, such as the chlorides and naphthenates of iron, zinc, cobalt and similar heavy materials.

As an added feature of this invention, the sulfenamide-mercaptan mixtures of this invention are also useful for providing fast burning fuels suitable for use in rocket engines and the like wherein a hypergolic fuel is not necessarily required. For example, the fuel components of this invention are dispersed in a hydrocarbon, such as hydrocarbon diluents described above. Even if the resulting solution is not hypergolic with an oxidant such as fuming nitric acid, it can be used together with an oxidant and a suitable igniter as a rocket propellant. These fast burning fuels are particularly useful, if, for various reasons, a hypergolic fuel is not desired or required. The sulfenamide-mercaptan mixture of this invention may be added to a hydrocarbon fuel in a minor amount, usually from 1 to 20 percent by volume of the total mixture to produce fast burning fuels. Suitable fast burning fuels comprise from 1 to 10 percent by volume of a sulfenamide-mercaptan mixture described above with 90–99 percent by volume of a petroleum fraction in the gasoline boiling range. Specifically, such as fuel can comprise between 1 and 20 percent by volume of a mixture of 20 percent sulfenamide, 80 percent tert-butyl mercaptan and 80–99 percent by volume n-heptane.

The advantages of this invention are illustrated in the following examples. The reactants and their proportions and their specific ingredients are presented as being typical and are not to be construed as unduly limiting the invention.

EXAMPLE I

Each of the fuel mixtures described herein below was tested for spontaneous ignition employing fuming nitric acid as the oxidizer. In each test, 0.13 ml. of a mixture of propylene di(tert-butylsulfenamide) and tert-butyl mercaptan, either pure or including a diluent as a constituent thereof was dropped in a 1" x 8" test tube containing 0.3 ml. of fuming nitric acid. The temperature of the fuel and oxidant was lowered to −40° F. prior to mixing. Normal heptane was employed as the diluent to determine the maximum amount of dilution which the candidate fuel mixture would tolerate and retain its hypergolic properties. The results are set forth hereinbelow in Table I.

Table I

| Fuel | Oxidant | Percent Dilution | Solidification Point of Undiluted Mixture, °C. |
|---|---|---|---|
| 70%[1] tert-butyl mercaptan 30% propylene di(tert-butyl sulfenamide). | WFNA[2] | Ignition[4] | −60 |
| 60% tert-butyl mercaptan 40% propylene di(tert-butyl sulfenamide). | WFNA RFNA[3] | 20 10 | <−79 |
| 50% tert-butyl mercaptan 50% propylene di(tert-butyl sulfenamide). | WFNA RFNA | 20 20 | <−79 |
| 40% tert-butyl mercaptan 60% propylene di(tert-butyl sulfenamide). | WFNA RFNA | 30 20 | <−79 |
| 30% tert-butyl mercaptan 70% propylene di(tert-butyl sulfenamide). | WFNA RFNA | 30 30 | −68 |
| 20% tert-butyl mercaptan 80% propylene di(tert-butyl sulfenamide). | WFNA RFNA | 50 40 | −61 |
| 10% tert-butyl mercaptan 90% propylene di(tert-butyl sulfenamide). | WFNA RFNA | 50 50 | −56 |
| 100% propylene di(tert-butyl sulfenamide). | Solid | | −38 |
| (Fired at 50% dilution with n-heptane) | | | |
| 100% tert-butyl mercaptan | Solid | | −2 |

[1] Percent by volume.
[2] White fuming nitric acid.
[3] Red fuming nitric acid.
[4] No dilution.

The results show that mixtures of propylene di(tert-butyl sulfenamide) and tert-butyl mercaptan are liquids at −40° F. and withstand dilution of up to 50 volume percent of n-heptane and remain hypergolic under such dilutions at −40° F.

EXAMPLE II

Each of the fuel mixtures described hereinbelow was tested for spontaneous ignition employing fuming nitric acid as the oxidizer. In each test 0.13 ml. of the fuel to be tested, including the n-heptane diluent was dropped into a 1″ x 8″ test tube containing 0.3 ml. fuming nitric acid, the temperature of the fuel and oxidant was maintained at 70° F. Normal heptane was employed as the diluent to determine the maximum amount of diluent which each fuel would tolerate and retain its hypergolic properties. The results are set forth hereinbelow in Table II.

Table II

| Fuel | Oxidant | Percent Dilution |
|---|---|---|
| 90%[1] tert-butyl mercaptan 10% propylene di(tert-butyl sulfenamide) | WFNA[2] RFNA[3] | Ignition.[4] Ignition. |
| 80% tert-butyl mercaptan 20% propylene di(tert-butyl sulfenamide) | WFNA RFNA | 20. 10. |
| 70% tert-butyl mercaptan 30% propylene di(tert-butyl sulfenamide) | WFNA RFNA | 20. 20. |
| 60% tert-butyl mercaptan 40% propylene di(tert-butyl sulfenamide) | WFNA RFNA | 30. 30. |
| 50% tert-butyl mercaptan 50% propylene di(tert-butyl sulfenamide) | WFNA RFNA | 50. 50. |
| 40% tert-butyl mercaptan 60% propylene di(tert-butyl sulfenamide) | WFNA RFNA | 50. 60. |
| 30% tert-butyl mercaptan 70% propylene di(tert-butyl sulfenamide) | WFNA RFNA | 70. 70. |
| 20% tert-butyl mercaptan 80% propylene di(tert-butyl sulfenamide) | WFNA RFNA | 60. 60. |
| 10% tert-butyl mercaptan 90% propylene di(tert-butyl sulfenamide) | WFNA RFNA | 60. 60. |
| 100% tert-butyl mercaptan | WFNA RFNA | No Ignition. No Ignition. |
| 100% propylene di(tert-butyl sulfenamide) | WFNA RFNA | 70. 70. |

[1] Percent by volume.
[2] White fuming nitric acid.
[3] Red fuming nitric acid.
[4] No dilution.

As will be evident to those skilled in the art various modifications of this invention can be made or followed in the light of this disclosure without departing from the spirit or scope of this invention.

We claim:
1. In the method for developing thrust by the combustion of bi-propellant components in a combustion chamber of a reaction motor the steps comprising separately and simultaneously injecting a stream of an oxidant component and a fuel component into contact with each other in said combustion chamber, in such proportions as to produce spontaneous ignition, said fuel component comprising a mixture of a sulfenamide and a mercaptan; said sulfenamide being selected from the group consisting of sulfenamides having the following structural formulas:

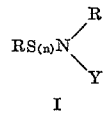

I

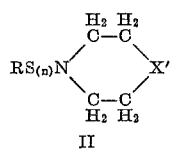

II

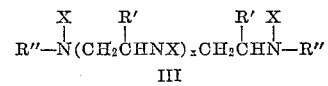

III wherein X is selected from the group consisting of hydrogen and an $S_{(n)}R$ group, at least one X being an $S_{(n)}R$ group, R is selected from the group consisting of an alkyl group containing from 1 to 12 carbon atoms, an alkenyl group containing from 2 to 12 carbon atoms, a cycloalkyl group containing from 5 to 6 carbon atoms, and an aryl group containing 6 carbon atoms, R' is selected from the group consisting of hydrogen and a methyl radical, R″ is selected from the group consisting of hydrogen, an alkyl group containing from 1 to 12 carbon atoms, an alkenyl group containing from 2 to 12 carbon atoms, a cycloalkyl group containing from 5 to 6 carbon atoms and an aryl group containing 6 carbon atoms, X' is selected from the group consisting of a methylene group, $=NR$, $=NH$, $=NS_{(n)}R$, sulfur, and oxygen, Y is selected from the group consisting of hydrogen and an $S_{(n)}R$ group, $n$ is a positive whole number not over 2 and when X' is oxygen $n$ in Formula II is 2, $x$ is a whole number from 0 to 5, inclusive, and the sulfenamide constituent contains not more than 30 carbon atoms; and said mercaptan being at least one mercaptan having the formula

RSH wherein R is selected from the group consisting of alkyl and alkenyl radicals having not more than 10 carbon atoms.
2. The method of claim 1 wherein said sulfenamide is propylene di(tert-butyl sulfenamide).
3. The method of claim 2 wherein said mercaptan is tert-butyl mercaptan.
4. The method of claim 1 wherein said sulfenamide is N,n-butyl-tert-butylsulfenamide.
5. The method of claim 4 wherein said mercaptan is tert-butyl mercaptan.
6. The method of claim 1 wherein said sulfenamide is N-tert-butylsulfenylpiperidine.
7. The method of claim 6 wherein said mercaptan is tert-butyl mercaptan.
8. The method of claim 1 wherein said sulfenamide is N-tert-butylthiosulfenylmorpholine.
9. The method of claim 1 wherein said sulfenamide is N-ethylsulfenylpiperidine.
10. The method of claim 1, wherein said oxidizer and said mixture of sulfenamide and mercaptan are employed in a ratio, based upon stoichiometric amounts, of 0.5:1 to 6:1.

11. The method of claim 9 wherein said mercaptan is tert-butyl mercaptan.

12. The method of claim 1 wherein said mercaptan is tert-butyl mercaptan.

13. The method of claim 1 wherein said mercaptan is allyl mercaptan.

14. The method of claim 1 wherein said mercaptan is tert-hexyl mercaptan.

15. The method of claim 1 wherein said mercaptan is isopropyl mercaptan.

16. The method of claim 1 wherein said mercaptan is isopropenyl mercaptan.

17. The method of claim 1 wherein said fuel component consists essentially of a liquid hydrocarbon in the $C_5$ to $C_{35}$ range and said mixture of a sulfenamide and a mercaptan.

18. A fuel composition consisting essentially of a liquid hydrocarbon in the $C_5$ to $C_{35}$ range in an amount within the range of 10 to 70 percent by volume and from 90 to 30 percent by volume of a mixture of a sulfenamide and a mercaptan, said sulfenamide being present in said mixture in an amount between 10 and 90 mol percent and selected from the group consisting of sulfenamides having the following structural formulas:

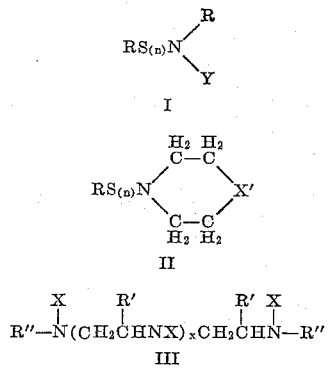

$$R''\!-\!\underset{\underset{X}{|}}{N}(CH_2\underset{\underset{R'}{|}}{C}HNX)_x CH_2\underset{\underset{R'}{|}}{C}HN\!-\!R''$$

III wherein X is selected from the group consisting of hydrogen and an $S_{(n)}R$ group, at least one X being an $S_{(n)}R$ group, R is selected from the group consisting of an alkyl group containing from 1 to 12 carbon atoms, an alkenyl group containing from 2 to 12 carbon atoms, a cycloalkyl group containing from 5 to 6 carbon atoms, and an aryl group containing 6 carbon atoms, R' is selected from the group consisting of hydrogen and a methyl radical, R" is selected from the group consisting of hydrogen, an alkyl group containing from 1 to 12 carbon atoms, an alkenyl group containing from 2 to 12 carbon atoms, a cycloalkyl group containing from 5 to 6 carbon atoms and an aryl group containing 6 carbon atoms, X' is selected from the group consisting of a methylene group, $=NR$, $=NH$, $=NS_{(n)}R$, sulfur, and oxygen, Y is selected from the group consisting of hydrogen and an $S_{(n)}R$ group, $n$ is a positive whole number not over 2 and when X' is oxygen $n$ in Formula II is 2, $x$ is a whole number from 0 to 5, inclusive, and the sulfenamide constituent contains not more than 30 carbon atoms; and said mercaptan being at least one mercaptan having the formula

RSH wherein R is selected from the group consisting of alkyl and alkenyl radicals having not more than 10 carbon atoms.

19. The fuel of claim 18 wherein said sulfenamide is propylene di(tert-butyl sulfenamide).

20. The fuel of claim 18 wherein said sulfenamide is N,n-butyl-tert-butylsulfenamide.

21. The fuel of claim 18 wherein said sulfenamide is N-tert-butylsulfenylpiperidine.

22. The fuel of claim 18 wherein said sulfenamide is N-tert-butylthiosulfenylmorpholine.

23. The fuel of claim 18 wherein said sulfenamide is N-ethylsulfenylpiperidine.

24. The fuel of claim 18 wherein said mercaptan is tert-butyl mercaptan.

25. The fuel of claim 18 wherein said mercaptan is allyl mercaptan.

26. The fuel of claim 18 wherein said mercaptan is tert-hexyl mercaptan.

27. The fuel of claim 18 wherein said mercaptan is isopropyl mercaptan.

28. The fuel of claim 18 wherein said mercaptan is isopropenyl mercaptan.

29. The fuel of claim 18 wherein a hydrocarbon in the $C_5$ to $C_{16}$ range forms a part of said fuel.

30. The fuel of claim 18 wherein said mixture consists essentially of propylene di(tert-butyl sulfenamide and tert-butyl mercaptan.

31. The fuel of claim 18 wherein said mixture consists essentially of N,n-butyl-tert-butylsulfenamide and tert-butyl mercaptan.

32. The fuel of claim 18 wherein said mixture consists essentially of N-tert-butylsulfenylpiperidine and tert-butyl mercaptan.

33. The fuel of claim 18 wherein said mixture consists essentially of N-tert-butylthiosulfenylmorpholine and tert-butyl mercaptan.

34. The fuel of claim 18 wherein said mixture consists essentially of N-ethylsulfenylpiperidine and tert-butyl mercaptan.

References Cited in the file of this patent

UNITED STATES PATENTS

| | | |
|---|---|---|
| 2,439,734 | Himel et al. | Apr. 13, 1948 |
| 2,520,400 | Himel | Aug. 29, 1950 |
| 2,520,401 | Himel et al. | Aug. 29, 1950 |
| 2,523,898 | Carlson | Sept. 26, 1950 |
| 2,557,018 | Viles | June 12, 1951 |